United States Patent [19]

Peterson et al.

[11] 4,452,760

[45] Jun. 5, 1984

[54] HORIZONTAL AMMONIA CONVERTER

[75] Inventors: Robert B. Peterson; Ralph Finello, both of Houston, Tex.; George A. Denavit, Aurora, Colo.

[73] Assignee: The M. W. Kellogg Company, Houston, Tex.

[21] Appl. No.: 340,135

[22] Filed: Jan. 18, 1982

[51] Int. Cl.$^3$ ............................................. C01C 1/04
[52] U.S. Cl. ................................... 422/148; 422/193; 422/203
[58] Field of Search ................ 422/148, 190, 193, 203

[56] References Cited

U.S. PATENT DOCUMENTS

| | | | |
|---|---|---|---|
| 3,516,800 | 6/1970 | Yamamoto et al. | 422/148 |
| 3,556,738 | 1/1971 | Schober | 422/148 |
| 3,567,404 | 3/1971 | Axelrod et al. | 422/190 |
| 3,753,662 | 8/1973 | Pagani et al. | 422/148 |
| 4,205,044 | 5/1980 | Gramatica | 422/148 |

Primary Examiner—Peter Chin

[57] ABSTRACT

A horizontal, cold wall, catalytic converter useful in ammonia synthesis having an internal feed/effluent heat exchanger and plurality of catalyst beds arranged for preheating reactant gases by indirect heat exchange with effluent from the first catalyst bed and subsequent gas flow to a second catalyst bed the gas flows being directed by gas transfer means disposed between the first catalyst bed and the heat exchanger.

1 Claim, 6 Drawing Figures

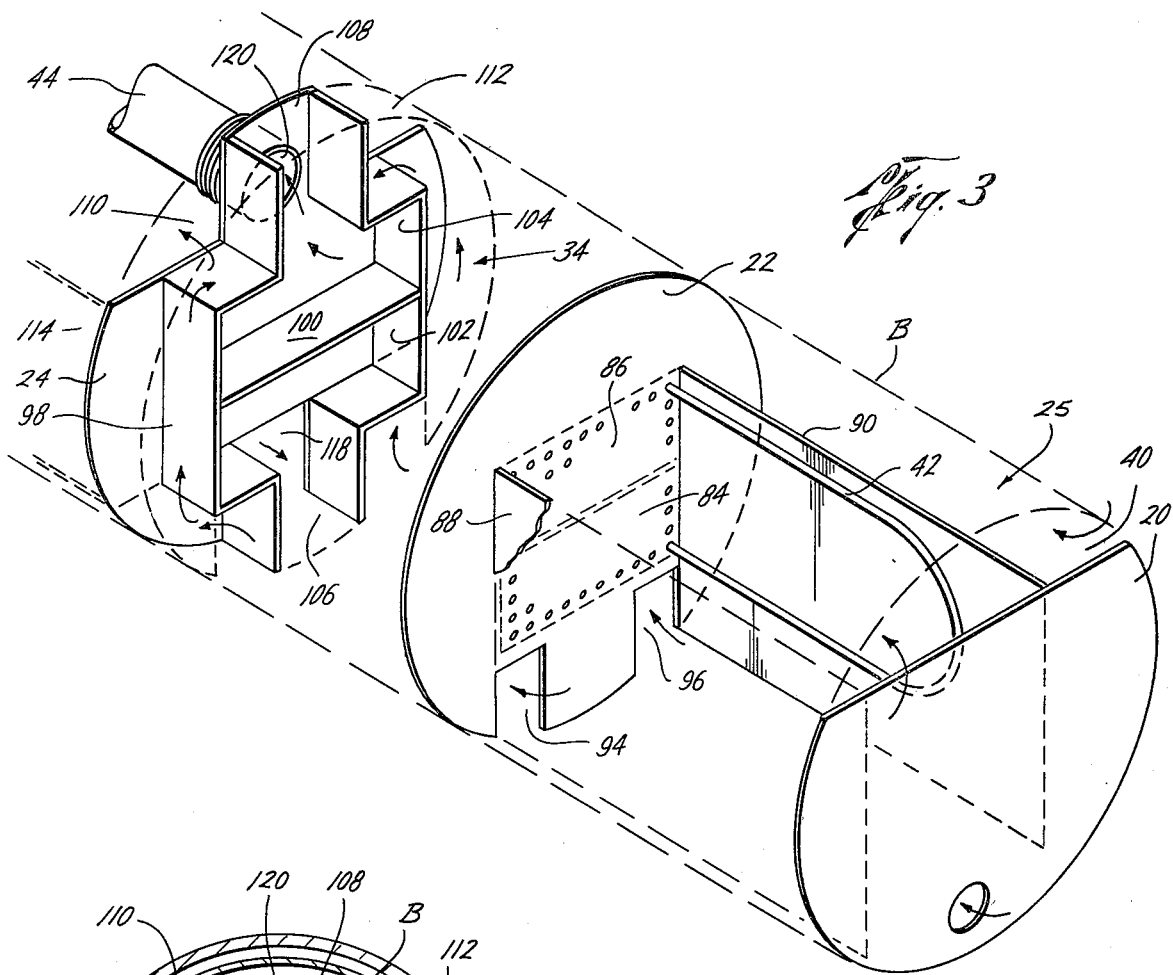
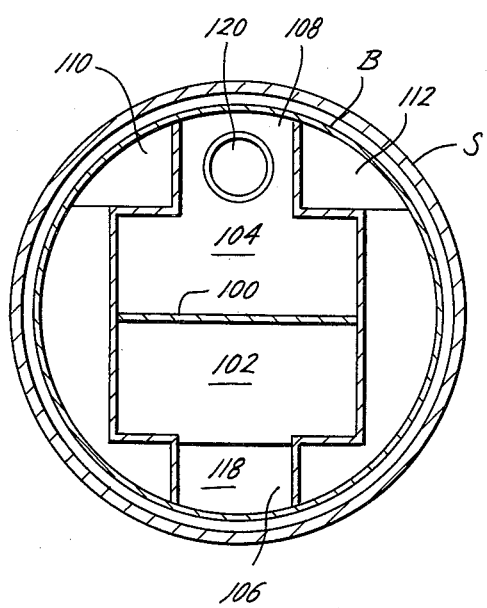
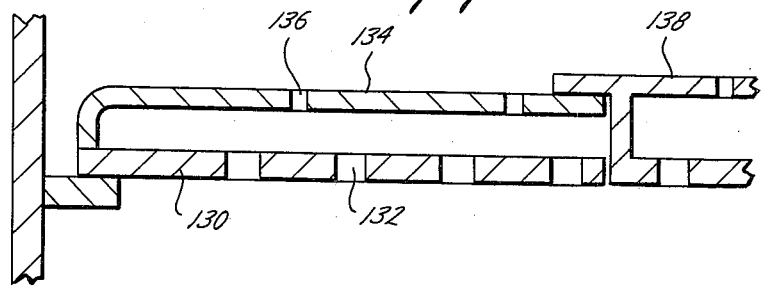

HORIZONTAL AMMONIA CONVERTER

BACKGROUND OF THE INVENTION

The present invention relates to a horizontal converter adapted for use in the synthesis of ammonia. More particularly, the present invention involves a converter which has at least two horizontal catalyst beds with a low pressure drop design and where all the synthesis gas passes through each of the catalyst beds. Unique to the converter is an inner cylindrical shell or basket with a gas transfer section which passes the preheated synthesis gas to the top of the first catalyst bed and passes the gas from the bottom of the first catalyst bed to heat exchange tubes before passing through a tube to the second catalyst bed.

The conventional ammonia converter is a vertical converter. A vertical "quench type" reactor is illustrated in U.S. Pat. No. 3,475,136. A "quench type" converter is one wherein cold reactant gas is mixed with the hot reactant gases flowing from one catalyst bed before passing through another catalyst bed to regulate the temperature of the gases. In U.S. Pat. No. 3,567,404, a horizontal quench type converter is disclosed which uses a series of concentric pipes to inject quench gas. In U.S. Pat. No. 4,180,543, an ammonia converter is disclosed with parallel catalyst beds to lower the pressure drop.

SUMMARY OF THE INVENTION

The horizontal converter of the present invention comprises an inner and outer cylindrical shell having more than one horizontal bed of catalyst. In employing the apparatus of this invention, synthesis gas (a mixture of hydrogen and nitrogen to produce ammonia) is supplied through the inlet of the outer shell and passes through the annular passage between the outer shell and the inner shell. The gas enters the inner shell through a heat exchange section where the gas is heated. The gas then passes through a gas transfer section to the top of the first horizontal catalyst bed. The ammonia reaction is exothermic producing hot reaction gas which is removed from the bottom of the first catalyst bed through one portion of a reduced internal cross-section of the gas transfer section. The hot gases are passed to one end of the tubes in the heat exchange section and cooled gases removed from the tubes in another portion of the reduced internal cross-section of the gas transfer section. The cooled gases pass through a pipe to the second catalyst bed. The design of the converter of the present invention provides low pressure drop and maximum conversion per pass since all the synthesis gas passes through all the catalyst in the reactor.

BRIEF DESCRIPTION OF THE DRAWINGS

FIG. 1 is a sectional view of the horizontal converter of the present invention;

FIG. 1A is a sectional view showing the gas flow through the converter of the present invention;

FIG. 2 is a sectional view taken along 2—2 of FIG. 1 showing one end of the inner cylindrical shell;

FIG. 3 is an expanded, isometric view of the gas transfer section, separated to show the details of this section within the inner cylindrical shell;

FIG. 4 is a sectional view taken along 4—4 of FIG. 1; and

FIG. 5 is a sectional view of a portion of the distribution plates at the top of the catalyst bed shown in section 5 of FIG. 1.

DESCRIPTION OF THE PREFERRED EMBODIMENT

In the drawings, the letter S designates the outer shell of the present invention. The outer shell S is a cylindrical pressure vessel which includes a main body 10 having an inlet 12 and an outlet 14 at one end. Removably attached to main body 10 is a head 16. Head 16 has a quench gas inlet 18. The functions of the inlets and outlet will be described in more detail hereinafter.

Removably positioned within outer shell S is an inner shell or basket B. The inner shell B is a cylindrical vessel which is divided into sections. The end wall 20 and a first wall 22 define a heat exchange section 25 of shell B. A second wall 24 and a third wall 26 define a first catalyst section 28. Between third wall 26 and the outer end wall 30 of shell B is defined a second catalyst bed section 32. A unique gas transfer section 34 is between first wall 22 and second wall 24. The details of each section will be described in more detail hereinafter.

For illustrative purposes, the converter of the present invention is described herein relative to its use in the catalytic synthesis of ammonia from nitrogen and hydrogen, it being understood that its use as an ammonia converter is not so limited. In the synthesis of ammonia, a synthesis gas which is predominately hydrogen and nitrogen, usually in a 3 to 1 ratio, is passed over an ammonia synthesis catalyst at pressures which range from 50 to 400 atmospheres. The commercial ammonia synthesis catalysts now employed are iron or modified iron catalysts which operate at temperatures between 260° C. and 540° C. The ammonia reaction is exothermic and the converter of the present invention is designed for the removal or handling of the exothermic heat produced in the reaction. Referring to FIG. 1 and especially FIG. 1A, the gas flow and operation of the converter of the present invention is shown. The synthesis gas enters the outer shell S through inlet 12. The gas is at a temperature below the desired reaction temperature but maintains the outer shell S at low temperatures as it passes through the annular space 36 (shown enlarged in FIG. 1A) between the outer shell S and the inner shell B. Preferably, the gas is introduced through inlet 12 at one end and flows to the other end where it passes through opening 40 in end wall 20. Opening 40 is at the top of end wall 20 where the gas enters the heat exchange section 25 of inner shell B. The gas passes downward over a plurality of tubes 42 heating the gas to reaction temperatures. As shown in FIG. 1A and which will be described in detail hereinafter, the gas enters the bottom of gas transfer section 34 and passes to the top where it enters the first catalyst bed section 28 above a horizontal bed of catalyst. As the gas passes through the catalyst the hydrogen and nitrogen react to form ammonia and due to the exothermic reaction the product gases are hotter than the entering gas. The product gas contains a mixture of ammonia and unreacted hydrogen and nitrogen. The product gas passes through gas transfer gas section 34 where it enters the inside of tubes 42. As the product gas passes through the tubes 42 it is cooled in heat exchange section 25. The cooled product gas then reenters gas transfer section 34 where it enters a pipe 44 which extends from gas transfer section 34, through first catalyst bed section 28 and passes through openings 46 in pipe 44 above a horizontal bed of catalyst in second catalyst bed section 32. It is preferred that the second catalyst bed section 32 comprises two horizontal beds of catalyst through which the product gas from the first bed of catalyst passes. Further ammonia is produced and again the product gas is heated. The hot reaction product gas then passes though end wall 30 through an outlet pipe 48 where it passes through outlet 14.

The general gas flow and function of the converter of the present invention having been described, the specific features of a preferred embodiment are shown with reference to FIGS. 2 through 5. The outer shell S has a removable head 16 so that the inner shell or basket B may be removed for loading catalyst and for catalyst changes. Shell B is rolled into outer shell S by means of wheels 50 and 52 attached to the end of shell B. Stops 54 and 56 correctly position the distance shell B enters the main body 10 of outer shell B. When shell B meets stops 54 and 56, jacks are placed on jack supports 58 and 60 to remove wheels 50 and 52. Rollers (not shown) on the outer surface of shell or basket B assist in maintaining basket B centered even when it expands on heating. The wheels are removed through manhole 62 at the end of main body 10. The shell B is then centered in shell S and locked into position by locks 64 and 66. The outlet pipe 48 comprises several sections. Section 68 has flanges 70 and 72 at each end respectively, which are connected by a person working within the main body 10. After securing the shell B within Shell S, the removable head 16 is secured. A person enters through manhole 74 in head 16 to connect a section 76 of the quench gas pipe 78. The quench gas pipe extends at one end into the bottom of the heat exchange section 25 and has a plurality of openings 80. At the outer end of quench gas pipe 78 is an expansion joint 82 inside the head 16 before passage through outlet 18.

Referring to FIG. 3, which shows the details of the heat exchange section 25 and the gas transfer section 34, the unique handling of the gases within the converter of the present invention is shown. The fresh synthesis gas introduced through inlet 12 passes on the outer surface of inner shell B and through opening 40 at the top of end wall 20. The gas enters heat exchange section 25. A plurality of tubes 42 extend from lower inlet tubesheet 84 and return to upper outlet tubesheet 86. Both tubesheet 84 and 86 are part of wall 22. Surrounding the tubes 42 are retainer walls 88 and 90. Extending from end wall 20 are a plurality of baffles 92. The gas entering heat exchange section 25 thus flows over tubes 42, because of the retainer walls 88 and 90 and the baffles 92, to the bottom of section 25. At the bottom of wall 22, within retainer walls 88 and 90, are two openings 94 and 96 where the gas enters transfer section 34.

The gas transfer section 34 has a reduced internal cross-section 98. Preferably, cross-section 98 is cruciform, i.e. cross shaped. The internal cross-section 98 is divided by horizontal partition 100 into a lower portion 102 and an upper portion 104. The shape of lower portion 102 and upper portion 104 conforms to the shape of tube sheets 84 and 86, which are preferably rectangular. Extending from lower portion 102 is a portion 106 which extends to the inner wall of main body 10. Likewise, upper portion 108 extends from upper portion 104 to the inner wall of main body 10. Hence, the gas which passes through openings 94 and 96 passes externally of the reduced internal cross-section 98 from the bottom of gas transfer section 34 to the top where it passes through opening 110 and 112 in wall 24. The openings 110 and 112 open into first catalyst bed section 28. The gas then passes through first catalyst bed 114. The product gas from first catalyst bed 114 passes through opening 118 in wall 24 and through the portion 106 and enters the tubes 42 through inlet tubesheet 84. The gas in tubes 42 is cooled by heat exchange with the fresh gas in heat exchange section 24. The cooled gas passes out of tubes 42 through exit tubesheet 86 and into upper portion 104. The gas then passes into portion 108 and through opening 120 of wall 24 into tube 44. The cooled gas passes through the openings 46 above the second catalyst bed 122 in the second catalyst bed section 32. Preferably, the second catalyst bed section 32 is in two sections formed by partial wall 124 which extends above catalyst bed 122 and partial wall 126 which extends below adjacent catalyst bed 128. The gas after passing through catalyst bed 128 is removed through outlet pipe 48 and outlet 14.

The gas may be distributed before passing through the catalyst beds 114, 122 and 128 by lower plates 130 which have a larger number of larger openings 132 than in upper plate 134. The upper plate has a fewer number of smaller openings 136 which are positioned so that none are aligned with openings 132 in lower plate 130. A number of manhole plates 138, as shown in FIG. 5, permit access to the catalyst bed. Likewise, a number of manholes 140 in shell B permit access to first catalyst bed section 28 and second catalyst bed section 32. When shell B is removed from shell S, easy access may be had to the catalyst beds to load or unload the catalyst.

We claim:

1. A horizontally disposed converter for use in the synthesis of ammonia comprising:
   (a) a horizontally disposed cylindrical outer shell having a removable head at one end thereof;
   (b) a horizontally disposed basket comprising a horizontally disposed cylindrical inner shell having end walls at each end thereof disposed within the outer shell in horizontally disposed relationship therewith and forming an annular passage therebetween, said annular passage being in flow communication with an inlet; said basket further including first, second and third transversely disposed walls therein in longitudinally spaced relationship with one another; said basket further having a heat exchange section disposed forwardly of said walls adjacent one end thereof and in flow communication through said first wall with said basket, said heat exchange section including a plurality of tubes and a tube sheet and being defined by the inner shell, one of said end walls and said first wall; said basket further having a gas transfer section defined by said inner shell, said first wall and said second wall, said gas transfer section having means to direct gas to a section further having means for directing the product gas from said first catalyst bed to said heat exchange section and further including means for directing the product gas from said heat exchange section into said second catalyst bed; said basket further having a first catalyst bed section defined by said inner wall, said second wall and said third wall, said basket further including a second catalyst bed section defined by said inner wall, said third wall and the opposite end wall, said first and second catalyst bed section containing respectively first and second catalysts beds arranged for downward flow;

(c) a gas inlet and a gas outlet respectively positioned in each end of said outer sheet and said basket;

(d) gas passage means defined by said formed annular passage for flowing gas in succession from gas inlet, through the formed annular passage, the end wall defining the heat exchange section, the heat exchange section externally of the tubes, the first wall, the gas transfer means, the second wall and the first catalyst bed;

(e) means for flowing gas from the heat exchange section inside of the tubes in succession through the first wall, the gas transfer means, the second wall, and the second catalyst bed; and (f) means for flowing gas from the second catalyst bed to the gas outlet.

* * * * *